United States Patent
Schinzler et al.

(10) Patent No.: US 11,003,454 B2
(45) Date of Patent: May 11, 2021

(54) APPARATUS AND METHOD FOR SPECULATIVE EXECUTION OF INSTRUCTIONS

(71) Applicant: Arm Limited, Cambridge (GB)

(72) Inventors: Michael Brian Schinzler, Austin, TX (US); Michael Filippo, Driftwood, TX (US); Yasuo Ishii, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/514,124

(22) Filed: Jul. 17, 2019

(65) Prior Publication Data

US 2021/0019150 A1     Jan. 21, 2021

(51) Int. Cl.
*G06F 9/38*     (2018.01)
*G06F 9/30*     (2018.01)

(52) U.S. Cl.
CPC ........ *G06F 9/3846* (2013.01); *G06F 9/30058* (2013.01); *G06F 9/3806* (2013.01)

(58) Field of Classification Search
CPC .................................................. G06F 9/3846
See application file for complete search history.

(56) References Cited

U.S. PATENT DOCUMENTS

| | | | | |
|---|---|---|---|---|
| 5,537,560 A | * | 7/1996 | Boggs ................. | G06F 9/30032 712/23 |
| 6,772,325 B1 | * | 8/2004 | Irie ..................... | G06F 9/30058 712/237 |
| 2005/0273310 A1 | * | 12/2005 | Newburn ............ | G06F 11/3409 703/17 |
| 2009/0150657 A1 | * | 6/2009 | Gschwind ............. | G06F 9/3804 712/239 |
| 2013/0318332 A1 | * | 11/2013 | Gonion ............... | G06F 9/30069 712/239 |
| 2014/0372736 A1 | * | 12/2014 | Greenhalgh .......... | G06F 9/3806 712/239 |
| 2016/0283247 A1 | * | 9/2016 | Venkatasubramanian ................... G06F 9/3017 |
| 2017/0249149 A1 | * | 8/2017 | Priyadarshi ......... | G06F 9/30145 |
| 2020/0174542 A1 | * | 6/2020 | Rao ........................ | G06F 1/324 |

* cited by examiner

*Primary Examiner* — Michael J Metzger
(74) *Attorney, Agent, or Firm* — Nixon & Vanderhye P.C.

(57) ABSTRACT

Apparatuses for data processing and methods of data processing are provided. A data processing apparatus performs data processing operations in response to a sequence of instructions including performing speculative execution of at least some of the sequence of instructions. In response to a branch instruction the data processing apparatus predicts whether or not the branch is taken or not taken further speculative instruction execution is based on that prediction. A path speculation cost is calculated in dependence on a number of recently flushed instructions and a rate at which speculatively executed instructions are issued may be modified based on the path speculation cost.

18 Claims, 6 Drawing Sheets

APPARATUS AND METHOD FOR SPECULATIVE EXECUTION OF INSTRUCTIONS

TECHNICAL FIELD

The present invention relates to data processing. More particularly the present invention relates to branch prediction and speculative execution of instructions in an out of order processor.

DESCRIPTION

In a data processing apparatus that allows speculative execution of instructions, techniques such as branch prediction may be employed to increase performance by enabling speculative execution of instructions along a predicted path. Instructions that lie along the predicted path are executed before it is known whether a branch that begins that path will actually be taken, so as to mitigate against a delay that would have to be incurred by only doing the work after it is known that it is needed, i.e., when the branch is resolved. If it turns out that the path is not taken, and that the work done by the processor was not needed, then the changes made by the data processing apparatus are discarded and the results are ignored. This type of speculation requires sophisticated branch prediction in order to minimise wasted processing and power expended on paths beyond branches that later are found to have been mispredicted and cause the cancelation of a number of speculatively executed instructions. On the one hand such sophisticated branch prediction is complex, but on the other hand there is the desire to avoid wasted processing expended on instruction paths which follow mispredicted branches.

SUMMARY

In some example embodiments described herein there is an apparatus comprising: data processing circuitry to perform data processing operations in response to a sequence of instructions, wherein the data processing circuitry is capable of performing speculative execution of at least some of the sequence of instructions; and branch prediction circuitry to generate a branch prediction of whether a branch instruction in the sequence of instructions will be taken or not taken, wherein the data processing circuitry is responsive to the branch prediction to perform speculative execution of instructions in dependence on the branch prediction, wherein the data processing circuitry is responsive to generation of the branch prediction by the branch prediction circuitry to calculate a path speculation cost in dependence on a number of recently flushed instructions, and the data processing apparatus further comprises throttle control circuitry configured to control a rate at which instructions are passed to the data processing circuitry in dependence on the path speculation cost.

In some example embodiments described herein there is a method of performing data processing comprising: performing data processing operations by data processing circuitry in response to a sequence of instructions, wherein the data processing circuitry is capable of performing speculative execution of at least some of the sequence of instructions; generating a branch prediction of whether a branch instruction in the sequence of instructions will be taken or not taken; performing, in response to the branch prediction, speculative execution of instructions in dependence on the branch prediction; calculating a path speculation cost in dependence on a number of recently flushed instructions; and controlling a rate at which instructions are passed to the data processing circuitry in dependence on the path speculation cost.

In some example embodiments described herein there is a data processing apparatus comprising: means for performing data processing operations in response to a sequence of instructions, wherein the means for performing data processing operations is capable of performing speculative execution of at least some of the sequence of instructions; means for generating a branch prediction of whether a branch instruction in the sequence of instructions will be taken or not taken; means for performing, in response to the branch prediction, speculative execution of instructions in dependence on the branch prediction; means for calculating a path speculation cost in dependence on a number of recently flushed instructions; and means for controlling a rate at which instructions are passed to means for performing data processing operations in dependence on the path speculation cost.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Before discussing the embodiments with reference to the accompanying figures, the following description of embodiments is provided.

In accordance with one example configuration there is provided an apparatus comprising: data processing circuitry to perform data processing operations in response to a sequence of instructions, wherein the data processing circuitry is capable of performing speculative execution of at least some of the sequence of instructions; and branch prediction circuitry to generate a branch prediction of whether a branch instruction in the sequence of instructions will be taken or not taken, wherein the data processing circuitry is responsive to the branch prediction to perform speculative execution of instructions in dependence on the branch prediction, wherein the data processing circuitry is responsive to generation of the branch prediction by the branch prediction circuitry to calculate a path speculation cost in dependence on a number of recently flushed instructions, and the data processing apparatus further comprises throttle control circuitry configured to control a rate at which instructions are passed to the data processing circuitry in dependence on the path speculation cost.

In out of order processing, a common way of increasing performance is to use branch prediction and speculative execution to execute a sequence of instructions along a predicted path. Increasing performance requirements require that many hundreds of instructions may be in-flight for out of order execution and latency hiding. This type of speculation requires sophisticated branch prediction in order not to waste effort on paths beyond branches that later mispredict and cancel a large number of speculatively executed instructions. Those cancelled instructions have wasted power and have an associated path speculation cost. Here we introduce the concept of path speculation cost. Path speculation cost represents how much work the processor does beyond a predicted branch that would be wasted if that branch were to be mispredicted.

In some embodiments, the path speculation cost is used by throttle control circuitry to control the rate at which instructions are issued. The data processing apparatus may decrease the rate at which speculative instructions are issued based on a high path speculation cost and may increase the rate at which speculative instructions are issued based on a low path speculation cost. In this way it is possible to control the potential wasted power by controlling the number of in-flight speculatively executed instructions.

In some embodiments, the throttle control circuitry may be further dependent on a confidence level indicating how likely the branch prediction is to be incorrect. When choosing whether to execute a predicted path, based on a branch prediction, a data processing apparatus may categorise the predicted outcome of a branch instruction as falling into one of four categories: strongly taken, taken, not taken, and strongly not taken. Of the branches that are taken, those that are "strongly taken" are assumed to be high confidence branches, whereas those that are "taken" are assumed to be low confidence branches. Better branch prediction can greatly reduce the number of mispredicts, but there will still be mispredictions. Mispredictions with high speculation cost should ideally be avoided as these have the greatest chance of wasting power. In order to estimate the likelihood that any of the in-flight unresolved branches are to mispredict, a confidence level is calculated, where the confidence level can be based on the predicted outcome of the in-flight unresolved branch instructions. The confidence level could be calculated in a variety of different ways. In some embodiments, the confidence level is based on a number of unresolved low confidence branches. Low confidence branches with high speculation cost are the desired paths to identify (for the purpose of avoidance). Once identified, the processor can effectively reduce the number of in-flight instructions by throttling the rate of instruction delivery until the confidence level associated with the in-flight branches is reduced. In the event that the rate of instruction delivery is throttled, speculatively executed instructions will be issued at a lower rate. If it is determined that the branch has been mispredicted then, due to the throttled instruction delivery rate, fewer instructions will have been executed and power that would have wasted along the speculation path is saved. If the branch predicts correctly, then instruction delivery is no longer throttled.

In some embodiments, the confidence level is further dependent on a number of unresolved low confidence branches and a number of unresolved high confidence branches. In such embodiments it may be considered that once a sufficiently large number of unresolved branches are in-flight it is desirable to throttle the rate at which instructions are issued even though many, if not all, of the branches are predicted at high confidence. It may be that the overall cost in the case of a branch misprediction becomes too high and the processing circuitry determines that it is not worth the risk of wasting a large amount of power associated with a high number of speculatively executed branches.

There are numerous ways in which the number of unresolved low confidence branches and the number of unresolved high confidence branches could be employed to determine a confidence level. However, in some embodiments the confidence level may be a linear function of the number of unresolved low confidence branches and the number of unresolved high confidence branches. Such a linear function of the number of low confidence branches and the number of high confidence branches can be written in the form $$C = a \times L + b \times H,$$

where a is the number of low confidence branches, H is the number of high confidence branches, C is the confidence level and a and b are coefficients that assign a weighting to each of the low confidence level and the high confidence level respectively. For example, in some embodiments the coefficient a could take the value 16 and the coefficient b could take the value 1. In this way a higher importance can be assigned to a large number of low confidence branches than a number of high confidence branches. Any other arbitrary combination of coefficient values is conceivable, tuned to the specific requirements of the system being implemented. It should be appreciated that when defined in this way, the higher the confidence level the lower the confidence. However, this choice is arbitrary and it would be readily apparent to the person of ordinary skill that an alternative (e.g. inverted) definition of the confidence level could be used. The choice of a linear function is just one possible option. The confidence level could be calculated using, for example, a quadratic, cubic or higher order polynomial function. Alternatively, the confidence level could be calculated using any one of a range of linear or non-linear mathematical functions and may be further dependent on one or more additional characteristics of the current state of the processing apparatus.

In some embodiments, the path speculation cost may be calculated in dependence on a ratio of a number of recently flushed instructions to a given number of instructions in a commit queue. There are a number of ways in which the calculation of the path speculation cost could be implemented in hardware. In some embodiments, the number of flushed instructions may be calculated by providing a first counter that is incremented for each instruction that is flushed. The number of instructions in a commit queue window may be calculated by providing a second counter that is incremented for each instruction that is either flushed from the commit queue, or is committed. In this way the path speculation cost can be generated by dividing the first counter by the second counter. The number of instructions over which the path speculation cost is calculated may take any of a number of values. However, in some embodiments, the number of instructions is large, for example the path speculation cost may be represented as a number of flushes per thousand instructions, or a number of flushes per ten thousand instructions. The path speculation cost may be recalculated on a rolling basis. However, in some embodiments, the data processing circuitry is arranged to recalculate the path speculation cost after a number of instructions have been added to the commit queue. In this way, the path speculation cost can be calculated over a first instruction window and applied over a second instruction window. For example, the path speculation cost could be calculated over one thousand instructions, and the path speculation cost could then be applied over the next ten thousand instructions before being updated. The updating of the path speculation cost can be achieved in a number of ways. In some embodiments, the path speculation cost is recalculated over the final subset of the number of instructions over which the path speculation cost is applied. For example, if the path speculation cost is calculated over one thousand instructions and is applied for the next ten thousand instructions, then at the start of the final one thousand instructions of the ten thousand instruction window over which the path speculation cost is applied, the first and second counters used to count the number of instructions and the number of flushes are zeroed. A new path speculation cost can then be calculated over the last one thousand instructions of the ten thousand instructions over which the path speculation cost is applied. Once the ten thousand instructions have completed, the path speculation cost can be updated to the new value based on the first and second counters. It should be noted that the numbers one thousand and ten thousand have been chosen for illustrative purpose only. It should be readily apparent to one of ordinary skill in the art that any numbers could be chosen for the first and second counters.

In particular it is noted that the number of instructions over which the path speculation cost is applied is not necessarily larger than the number of instructions over which the path speculation cost is counted. Although in this case it may be that multiple sets of first and second counters are required in order to frequently update the path speculation cost. For example, if the path speculation cost is calculated over one thousand instructions, but is only applied over a window of five hundred instructions, then two sets of counters could be provided such that the first set of counters is used to provide a path speculation cost for the first five hundred instructions and a second set of counters is used to provide a path speculation cost for the second five hundred instructions. Therefore, each set of counters is only required to update the path speculation cost once every one thousand instructions. In this manner a frequently updated path speculation cost can be maintained.

The data processing apparatus is provided with throttle control circuitry to control the rate at which instructions are issued. There are numerous ways in which the throttle control circuitry could be implemented. In some embodiments, the control by the throttle control circuitry of the rate at which instructions are passed to the data processing circuitry comprises stalling execution of instructions for a number of pipeline cycles. In this way, if it is considered that the path speculation cost for in-flight speculatively executed instructions associated with one or more predicted branches is too high then the rate at which instructions are issued can be decreased. The number of instructions for which the processing circuitry stalls execution can be any number. However, in some embodiments, the number of pipeline cycles is one.

There are numerous ways in which the throttle control circuitry can be triggered. However, in some embodiments, the control by the throttle control circuitry of the rate at which instructions are passed to the data processing circuitry is dependent on a threshold condition being met and is maintained until the threshold condition is no longer met. For example, once the confidence level reaches a threshold confidence level it may be considered that the risk associated with continuing to issue instructions at a high rate may be too large. Alternatively, or as well, if the path speculation cost reaches a threshold speculation cost it may be considered that the cost associated with continuing to issue instructions at a high rate is too large. In both these cases the throttle control circuitry will reduce the rate at which instructions are issued. The processing apparatus would continue to issue instructions at the reduced rate until either the confidence level drops below the threshold confidence level or the speculation cost drops below the threshold speculation cost. In some embodiments, the control by the throttle control circuitry of the rate at which instructions are passed to the data processing circuitry is dependent on a number of entries in a commit queue. For example, the greater the number of entries in the commit queue, the greater the level of throttling that is applied by the processing circuitry. If there is a large number of entries in the commit queue, such that the commit queue is becoming full, then the level of throttling could be increased. Conversely, if there is a small number of entries in the commit queue, or the commit queue is empty then a lower degree of throttling may be applied to the processing circuitry.

The control by the throttle control circuitry of the rate at which instructions are passed to the data processing circuitry can be based on at least one of the path speculation cost and the confidence level. In some embodiments, the control by the throttle control circuitry of the rate at which instructions are passed to the data processing circuitry is dependent on the path speculation cost reaching a threshold path speculation cost and the confidence level reaching a threshold confidence level. In these embodiments, throttling may not be applied until the confidence level has reached a threshold confidence level and the path speculation cost has reached a threshold path speculation cost. For example, if the path speculation cost is high, indicating that the current rate of flushed instructions is high, but the confidence level is low, indicating that there is high confidence in the in-flight instructions, then the throttle control circuitry may be configured to allow instructions to be issued without being throttled. Similarly, if the path speculation cost is low, indicating a low rate of flushed instructions, but the confidence level is high, indicating that there is low confidence in the in-flight instructions, then the throttle control circuitry may nevertheless be configured to allow instructions to be issued without being throttled (based on the current low rate of flushing). However, if both the path speculation cost is high and the confidence level is high, indicating that we have low confidence in the in-flight instructions, then the throttle control circuitry is configured to apply a throttle to the rate at which instructions are issued.

The throttle control may be further dependent on a range of different conditions. In some embodiments, the control by the throttle control circuitry of the rate at which instructions are passed to the data processing circuitry is dependent on a first condition and a second condition; wherein the first condition is met when the path speculation cost reaches a first threshold path speculation cost and the confidence level reaches a first threshold confidence level; and the second condition is met when the path speculation cost reaches a second threshold path speculation cost and the confidence level reaches a second threshold confidence level. In this way a range of different levels at which throttling occurs can be defined based on different confidence levels. For example, if the confidence level is medium but the path speculation cost is high, a throttle condition may be applied by the throttling circuitry. Similarly, if the path speculation cost is medium and the confidence level is high then a throttle condition may be applied. However, if both the confidence level and the speculation cost are medium then the throttle control circuitry may be configured not to apply a throttle. It will be appreciated by one of ordinary skill in the art that these embodiments are not limited to two sets of independent conditions. Rather, any number of different threshold conditions could be applied in combination. In some embodiments, the control by the throttle control circuitry of the rate at which instructions are passed to the data processing circuitry is further dependent on a third condition, the third condition is met when the confidence level reaches a third threshold confidence level. In this case it may be determined that if the confidence level reaches an upper threshold, indicating very low confidence in the speculatively executed instructions then throttling may be applied independently of the path speculation cost. For example, in some embodiments (and recognising that each of the specific values given is merely exemplary and each could be arbitrarily varied), the control by the throttle control circuitry may be applied when any of the following set of conditions are met:

path speculation cost>512, and when confidence level>28;
path speculation cost>256, and confidence level>40;
path speculation cost>128, and confidence level>48;
confidence level>52.

In this way a range of possible conditions for which to throttle can be defined based on a combination of the path speculation cost and the confidence level. In some embodiments, rather than defining a range of thresholds the control by the throttle control circuitry of the rate at which instructions are passed to the data processing circuitry may be applied when a function of the path speculation cost and the confidence level reaches a particular threshold. The function may be a linear function of the path speculation cost and the confidence level, but in other embodiments the function may be quadratic, higher order polynomial or any other mathematical function.

In some embodiments, the data processing apparatus is configured to execute threads from a plurality of threads, each thread comprising a plurality of instructions, and the rate at which instructions are passed to the data processing circuitry comprises at least a first rate and a second rate, and the data processing apparatus is configured to: issue instructions from a first thread from the plurality of threads at the first rate in dependence on a first path speculation cost calculated for the first thread; and issue instructions from a second thread from the plurality of threads at a second rate, wherein the second rate is modified in response to modifying the first rate. A multithreaded data processing apparatus is thus able to make use of a reduced rate at which instructions are issued from a first thread to advantageously issue a greater number of instructions from a second thread. For a processing apparatus that is running N threads, instructions from a given thread may generally be expected to be executed for an average of 1/Nth of the total number of pipeline cycles. If the threads are speculatively executing, the throttle control circuitry may reduce the rate at which instructions from one or more of the threads are issued based on the above techniques. As the rate at which instructions are issued for the one or more of the threads is reduced, then the number of pipeline cycles per second available to the remaining threads is increased. If the remaining threads are not executing speculatively, or if the remaining threads are executing speculatively but are not throttled, then the additional pipeline cycles per second available to the remaining threads can be utilised to increase the rate of instructions per second for the remaining threads. In this way an increase in the effective throughput of instructions can be obtained.

In some embodiments, the multithreaded data processing apparatus is configured to execute two threads using, for example, time division multiplexing to cause instructions from the two threads to be interleaved in time, where instructions from the first thread are executed at a first rate and instructions from the second thread are executed at a second rate, where the second rate is increased in response to a decrease in the first rate. In this way the total rate of instructions is maintained. However, if both the first and second set are executing speculatively and the throttle control circuitry considers it necessary to execute instructions from both threads at a reduced rate then the throttle control circuitry may stall the pipeline based on any of the abovementioned techniques or using other techniques as known to the person of ordinary skill.

The multithreaded data processing apparatus may maintain multiple sets of counters for counting the number of flushed instructions and the number of completed instructions for each thread. In addition a path speculation cost per thread and a confidence level per thread may be maintained. In other embodiments a single path speculation cost, based on a single pair of counters for the flushed instructions and the total number of instructions, may be provided in combination with a confidence level per thread. In further embodiments a single confidence level, describing the overall confidence of the plurality of threads in-flight, is provided with a path speculation cost per thread. The alternatives of maintaining only a single confidence level or a single path speculation cost can be used to reduce the required hardware and reduce power consumption whilst still providing the full functionality of the throttle control circuitry.

In some example embodiments described herein there is a method of performing data processing comprising: performing data processing operations by data processing circuitry in response to a sequence of instructions, wherein the data processing circuitry is capable of performing speculative execution of at least some of the sequence of instructions; generating a branch prediction of whether a branch instruction in the sequence of instructions will be taken or not taken; performing, in response to the branch prediction, speculative execution of instructions in dependence on the branch prediction; calculating a path speculation cost in dependence on a number of recently flushed instructions; and controlling a rate at which instructions are passed to the data processing circuitry in dependence on the path speculation cost.

In some example embodiments described herein there is a data processing apparatus comprising: means for performing data processing operations in response to a sequence of instructions, wherein the means for performing data processing operations is capable of performing speculative execution of at least some of the sequence of instructions; means for generating a branch prediction of whether a branch instruction in the sequence of instructions will be taken or not taken; means for performing, in response to the branch prediction, speculative execution of instructions in dependence on the branch prediction; means for calculating a path speculation cost in dependence on a number of recently flushed instructions; and means for controlling a rate at which instructions are passed to means for performing data processing operations in dependence on the path speculation cost.

Particular embodiments will now be described with reference to the figures.

Figure 1:
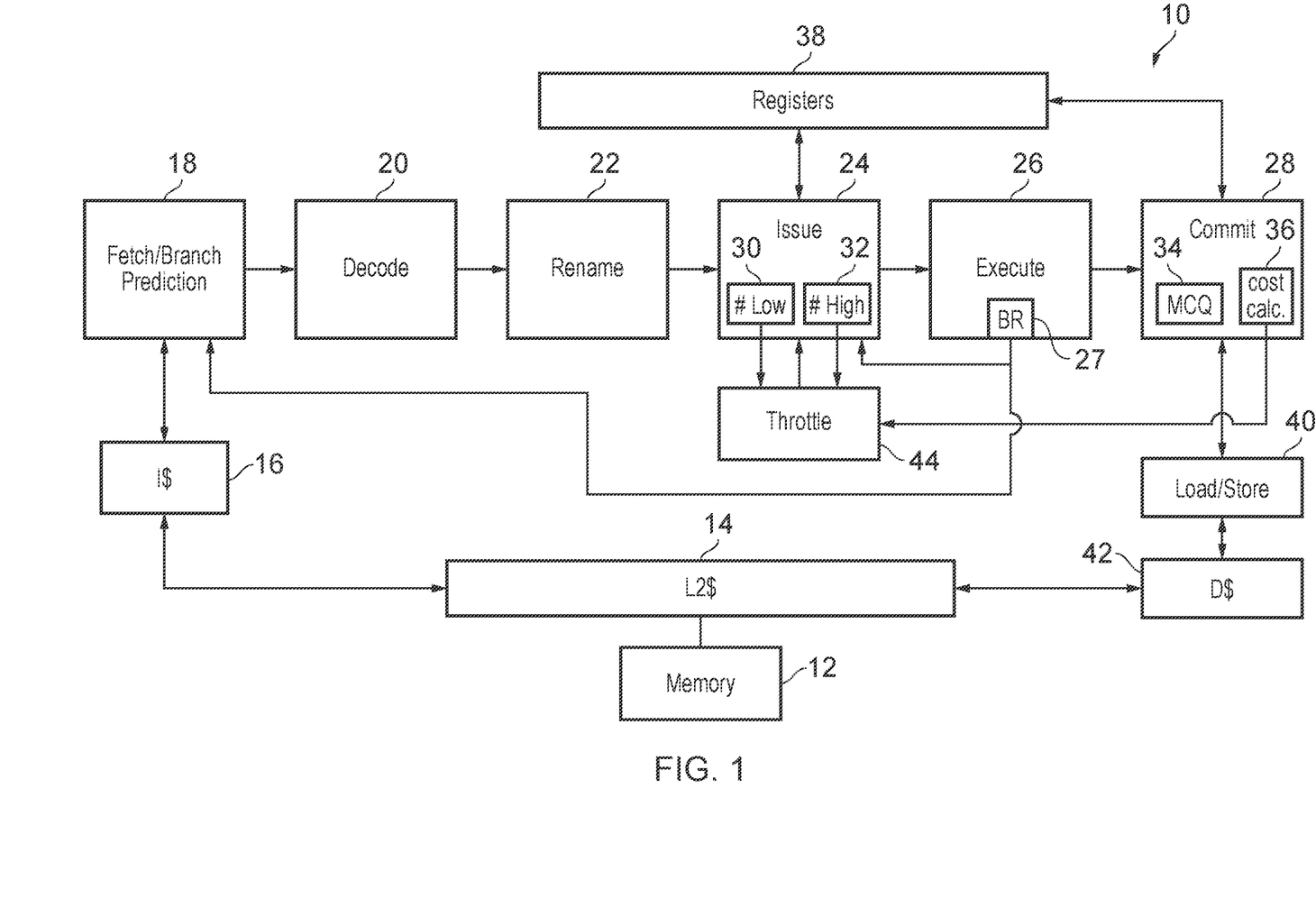
FIG. 1 schematically illustrates a data processing apparatus in some embodiments.

FIG. 1 illustrates a data processing apparatus 10 in some embodiments. Only a high-level view of the apparatus is presented in FIG. 1, to provide context for the components which are of particular relevance to a discussion of the present invention, and one of ordinary skill in the art will be familiar with the general structure of such a data processing apparatus which performs data processing operations in response to program instructions. Program instructions are stored in the memory 12 and are retrieved via level 2 (L2) cache 14 and instruction cache 16 by the fetch/branch prediction circuitry 18. Fetched instructions are passed to the decode circuitry 20, from there to the rename circuitry 22 and from there to the issue circuitry 24. The issue/branch prediction circuitry 18 is further configured to predict the outcome of branch instructions for which the dependencies are yet to be resolved. This prediction may be based on static, random or dynamic branch prediction, or any other method known to those of ordinary skill in the art. The issue stage 24 is provided with a low confidence counter 30 to count the number of in-flight low confidence branches, and a high confidence counter 32 to count the number of in-flight high confidence branches. Further detail of the issue stage 24 will be given with reference to the figures that follow. From the issue stage 24, instructions are dispatched to the processing circuitry provided by a number of execution stages 26 (which are illustrated as a single block merely for clarity of presentation) before being passed to the commit stage 28. The execute stage 26 also comprises a branch resolution unit 27, which generates indications of the resolution of branches. This information is passed back to the fetch/branch prediction circuitry 18 to be used in the instances where the branch prediction was incorrect to restart instruction execution down the alternative path. The branch resolution information is also passed to the issue stage 24, such that the low confidence counter 30 and the high confidence counter 32 can be updated (i.e. once a branch resolves it is no longer in-flight). The commit stage 28 comprises a main commit queue 34 and circuitry to calculate the speculation cost 36. Further example details of the commit stage 28 will be given with reference to the figures that follow. The commit stage is coupled to a set of registers 38 that comprise a set of physical registers in which data values can be stored. The registers 38 are also coupled to the issue circuitry 24. The commit stage is further coupled to a load/store stage 40, which enables the commit stage to write results via data cache 42 and L2 cache 14 to memory 12. Finally, the commit stage 28 is coupled via the cost calculation circuitry 36 and throttle control circuitry 44 to issue circuitry 24. In some embodiments the throttle control circuitry is provided as part of the rename stage 22, however, in other embodiments dedicated throttle control circuitry is provided separate to the rename stage 22. Further example details of the throttle control circuitry 44 will be provided with reference to the figures that follow.

Figure 2:
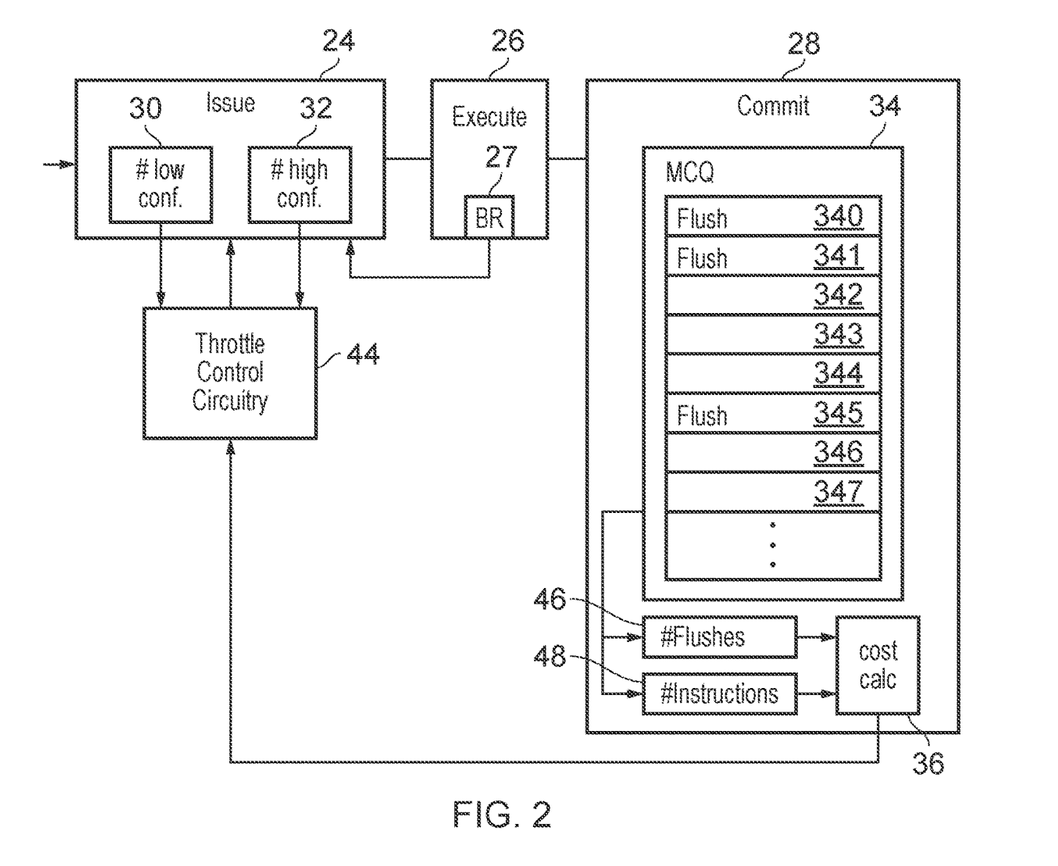
FIG. 2 schematically illustrates the interaction between issue circuitry, throttle control circuitry, execute circuitry and commit circuitry in some embodiments.

FIG. 2 illustrates further detail relating to the issue stage 24, the execute stage 26, the commit stage 28 and the throttle control circuitry 44. The issue stage 24 comprises low confidence counter 30 and high confidence counter 32. The fetch/branch prediction stage 18 provides information to the issue stage 24 regarding whether each of the predicted branches are high confidence or low confidence. The low confidence counter 32 is incremented for each low confidence branch that is issued and is decremented for each low confidence branch that is resolved. Similarly, the high confidence counter 34 is incremented for each high confidence branch that is issued and is decremented for each high confidence branch that is resolved. The low confidence counter 30 and the high confidence counter 32 are coupled to the throttle control circuitry 44. The commit stage 28 comprises a main commit queue 34, which contains an entry 340-347 for each instruction that has completed execution but has yet to be committed to the registers 38 or the memory 12 via the caches 42 and 14. Whilst only eight entries of the main commit queue 34 are labelled, it will be apparent to the person of ordinary skill that any number of entries could be provided in the main commit queue 34. In the embodiments illustrated in FIG. 2, entries 340, 341 and 346 have been marked as "Flush", indicating that these entries are to be flushed and not committed to the registers 38 or the memory 12 via the caches 42 and 14. The commit stage 28 is also provided with a flush counter 46, which counts the number of flushed instructions and a commit queue instruction counter 48, which counts the total number of instructions that have passed through the main commit queue 34. The number of flushes are counted over a window of instructions.

In some embodiments, the window of instructions is one thousand instructions, although this number is chosen for illustrative purpose and is not intended to be limiting. In order that the flush counter 46 and the commit queue instruction counter 48 are sufficiently large to handle one thousand instructions a ten bit counter is provided for the flush counter 46 and the commit queue instruction counter 48, although it will be apparent to the person of ordinary skill that any counter sufficiently large to count the number of instructions in the instruction window could be provided. For example a much larger counter could be provided to enable the length of the instruction window to be further increased. At the start of the window of instructions both the flush counter 46 and the commit queue instruction counter 48 are reset. Once instructions are executed they are passed to the main commit queue 24. As branches are resolved the entries in the main commit queue 24 are either committed or flushed. When an entry is flushed, both the flush counter 46 and the commit queue instruction counter 48 are incremented. When an entry is committed, only the commit queue instruction counter 48 is incremented. Once the commit queue instruction counter 48 reaches the number of instructions in the instruction window, where in this illustrative embodiment this occurs when the commit queue instruction counter 48 reaches one thousand, the flush counter 46 and the main commit queue instruction counter 48 are passed to the speculation cost calculation circuitry 36. The speculation cost calculation circuitry 36 uses the number of flushes and the number of instructions, provided by the flush counter 46 and the commit queue instruction counter 48, to calculate the path speculation cost using any of the techniques described above. The path speculation cost is then passed to the throttle control circuitry 44. Once a second window of instructions has passed, the flush counter 46 and the commit queue instruction counter 48 are reset and the process starts again. The number of instructions in the second instruction window may be counted using a dedicated counter or by reusing at least one of the flush counter 46 or the commit queue instruction counter 48. The throttle control circuitry takes the values provided by the low confidence counter 30, the high confidence counter 32 and the speculation cost calculation circuitry and calculates whether to reduce the rate at which instructions are issued based on any of the techniques described above.

Figure 3:
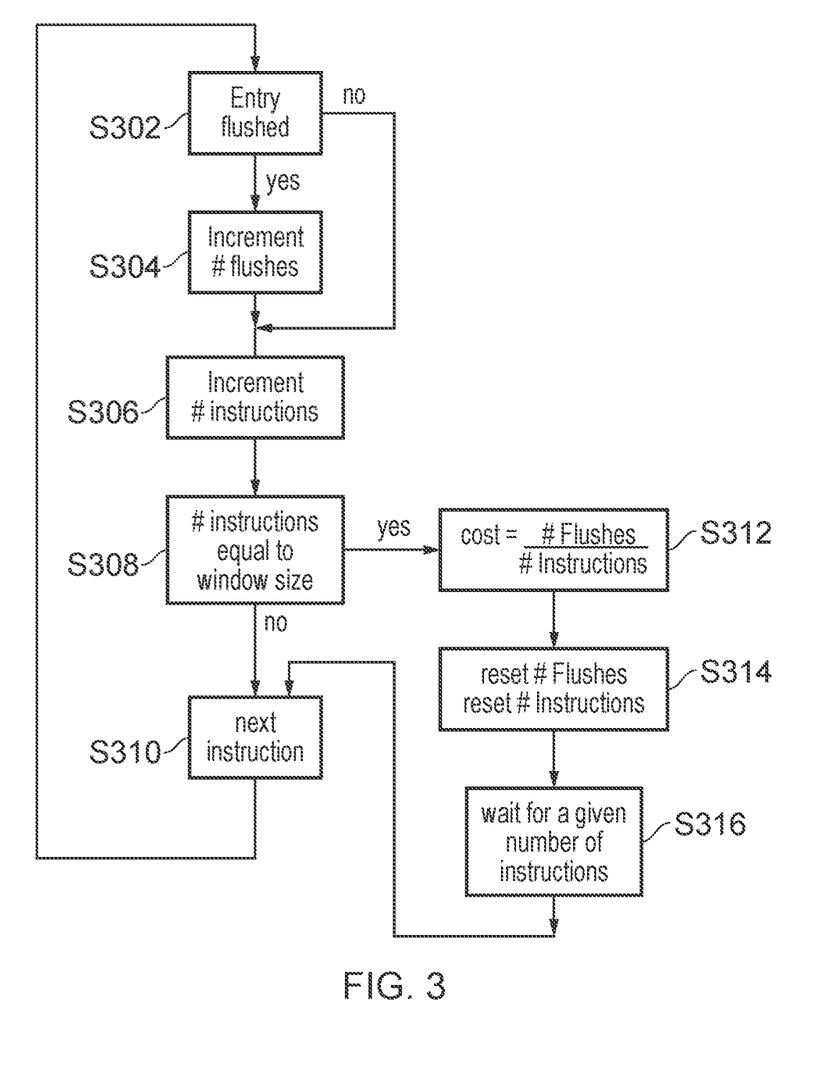
FIG. 3 illustrates a sequence of steps taken by the commit stage in some embodiments.

FIG. 3 is a flow diagram that illustrates a sequence of steps taken by the commit stage in some embodiments. In particular, the flow describes a sequence of steps taken with respect to entries in the commit queue when an entry is resolved and therefore is either committed or flushed. At step S302 it is determined if an entry is flushed, and if not then the flow proceeds to step S306. If it is then the flow proceeds to step S304. At step S304, the flush counter 46 is incremented and the flow proceeds to step S306. At step S306, the commit queue instruction counter 48 is incremented. At step S308 it is determined whether the number of instructions, counted by the commit queue instruction counter 48, is equal to the window size. If it is not, then the flow proceeds to step S310, where the next instruction is selected before moving back to step S302. Returning to step S308, if it is determined that the number of instructions, counted by the commit queue instruction counter 48, is equal to the window size then the flow proceeds to step S312, where the path speculation cost is calculated. In this embodiment, the path speculation cost is calculated by dividing the number of flushes, as counted by the flush counter 46, by the number of instructions, as counted by the commit queue instruction counter 48. The flow then proceeds to step S314, where the flush counter 46 and the commit queue instruction counter 48 are reset. At step S316, the flow waits for a given number of instructions. As described above the number of instructions for which the flow waits can be counted using a dedicated counter or at least one of the flush counter 46 or the commit queue instruction counter 48. When either or both of the flush counter 46 and the commit queue instruction counter 48 are used for this purpose, these counters are reset once the given number of instructions has elapsed. The flow then proceeds to S310, where the next resolved instruction is selected for processing (recognising that the flow will pause here if there are currently no resolved instructions) before moving back to step S302.

Figure 4:
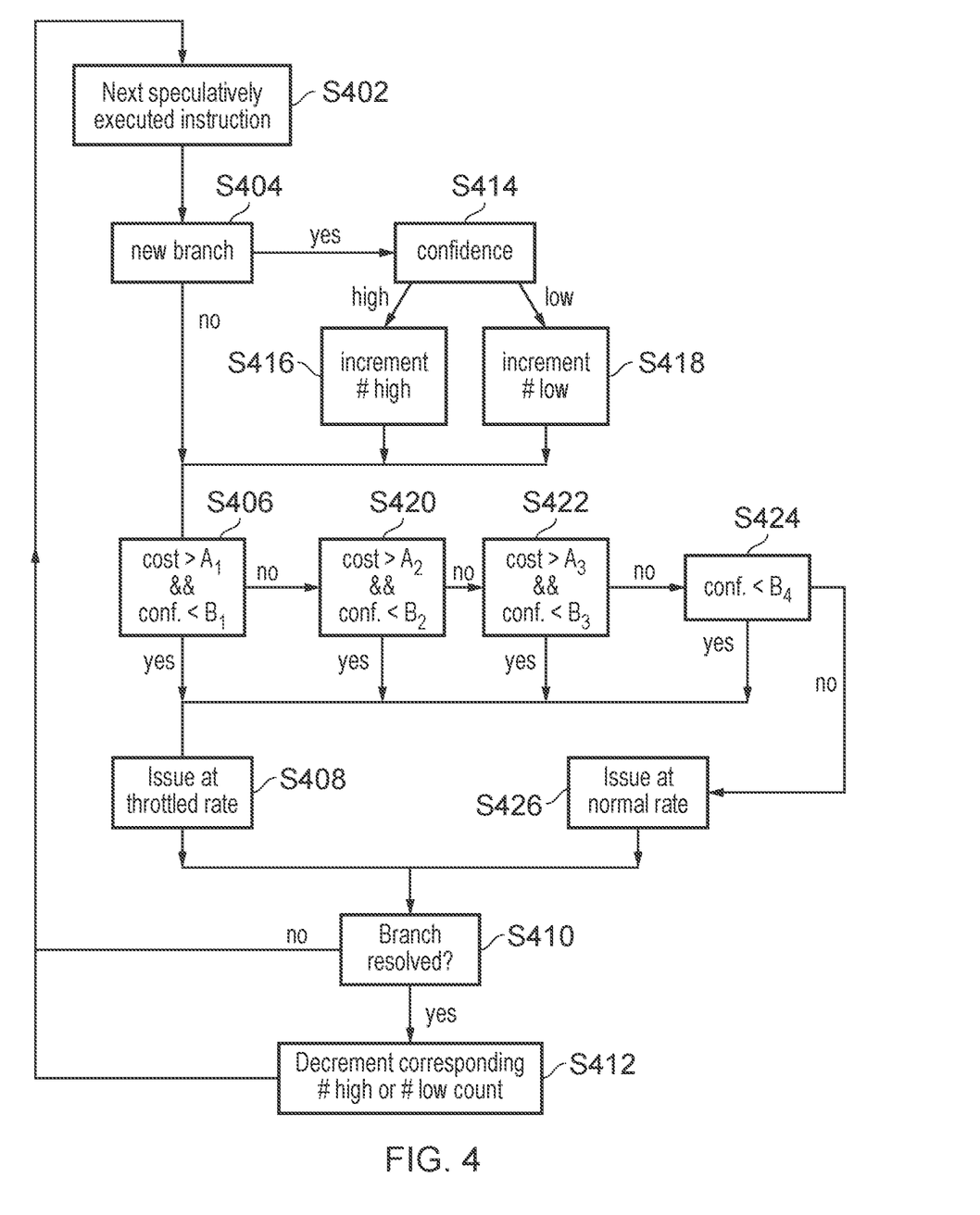
FIG. 4 illustrates a sequence of steps taken by the throttle control circuitry in some embodiments.

FIG. 4 is a flow diagram that illustrates a sequence of steps taken in some embodiments. The flow can be considered to start at step S402, where the next speculatively executed instruction is received. At S404 it is determined whether this instruction corresponds to a new branch, and if it does not then the flow proceeds to step 406, whereas if it does then the flow proceeds to step S141. At step S141 it is determined what the confidence level of the branch prediction is. If the confidence level is high then at step S416 the high confidence counter 32 is incremented, whereas if the confidence level is low then at step S418 the low confidence counter 30 is incremented. The flow then proceeds to step S406, where it is determined if the cost is greater than a first threshold $A_1$ and if the confidence level is greater than a first threshold $B_1$. If these conditions are met then the flow proceeds to step S408, where the instructions are issued at a throttled rate before the flow moves onto step S410. However, if the conditions at step S406 are not met then the flow proceeds to step S420, where it is determined if the cost is greater than a second threshold $A_2$ and if the confidence level is greater than a second threshold $B_2$. If these conditions are met, then the flow proceeds to step S408, where the instructions are issued at a throttled rate before flow moves onto step S410. However, if the conditions at step S420 are not met then flow proceeds to step S422, where it is determined if the cost is greater than a third threshold $A_3$ and if the confidence level is greater than a third threshold $B_3$. If these conditions are met, then the flow proceeds to step S408, where the instructions are issued at a throttled rate before the flow moves onto step S410. However, if the conditions at step S422 are not met then the flow proceeds to step S424, where it is determined if the confidence level is greater than a fourth threshold $B_4$. If this condition is met, then the flow proceeds to step S408, where the instructions are issued at a throttled rate before the flow moves onto step S410. However, if the condition at step S424 is not met, then the flow proceeds to step S426, where the instructions are issued at the normal rate before the flow moves onto step S410. At step S410 it is determined whether or not a branch has resolved. If it is not, then the flow returns to step S402. If it is determined at step S410, that a branch has resolved, then at step S412 the corresponding counter is decremented. If the branch that has resolved is a low confidence branch then the low confidence counter 30 is decremented. If the branch that has resolved is a high confidence branch then the high confidence counter 32 is decremented, the flow then returns to step S402.

FIG. 5A-5D schematically illustrate a sequence of throttled instructions issued by the data processing apparatus in some embodiments. Instructions are assumed to be executed in the order shown from left to right. It should be appreciated that the embodiments illustrated in FIGS. 5A to 5D are for illustrative purpose only and are not intended to limit the scope of protection. In particular, the length of the stall cycles, the duration over which throttling is applied, and the variation in rates of throttling can be controlled by any of the abovementioned methods or any other control method that falls within the scope of this disclosure.

Figure 5A:
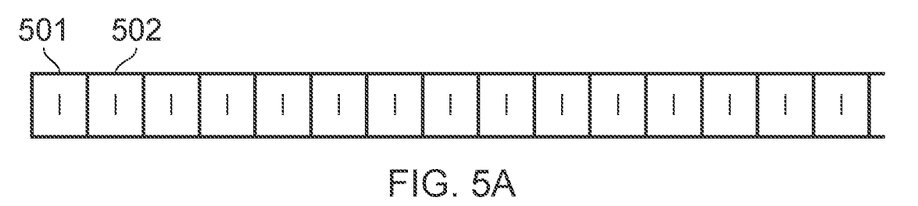
FIGS. 5A-5D schematically illustrates a sequence of throttled instructions issued by the data processing apparatus in some embodiments.

FIG. 5A illustrates the rate of instruction issue for a processing apparatus that is issuing a single thread of instructions when no throttle is applied to the rate at which instructions are issued. In this embodiment, when no throttle is applied an instruction is issued for every pipeline cycle 501, 502, etc.

Figure 5B:
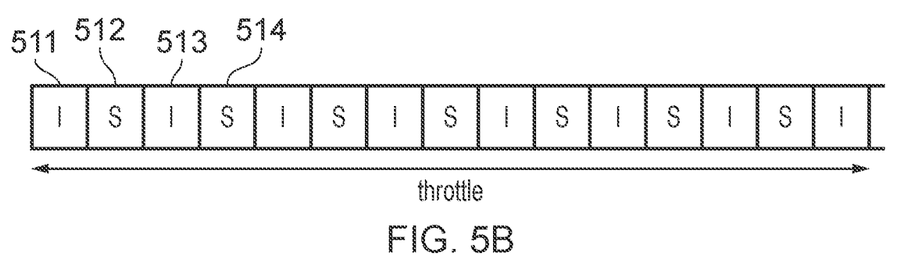

FIG. 5B illustrates the effect of a throttle being applied. The throttle may be applied due to any of the conditions described above. The applied throttle causes instructions to be issued at a reduced rate by issuing an instruction every second pipeline cycle 511, 513, etc. On the pipeline cycles when an instruction is not issued, a stall cycle is issued instead 512, 514, etc. In this way the rate at which instructions are issued is reduced.

Figure 5C:
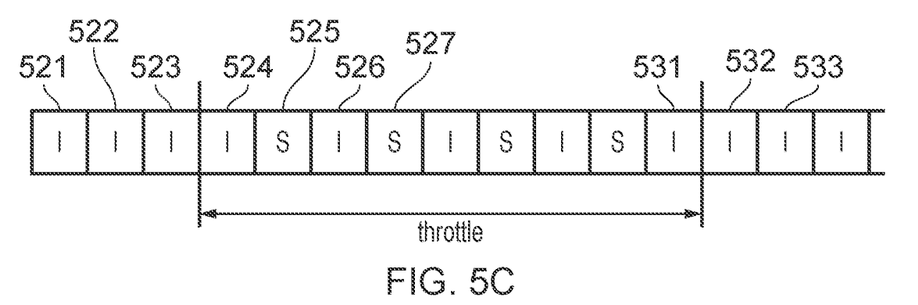

FIG. 5C illustrates the case in which a throttle is applied once a condition is met and the throttle is maintained until the condition is no longer met. Initially, no throttle is applied and an instruction is issued for every pipeline cycle 521, 522 and 523. After instruction 523 is issued, it is determined that a condition has been met and a throttle is due to be applied. In this embodiment it is determined that a throttle of the kind illustrated in FIG. 5B will be applied and instructions are issued on every second pipeline cycle 524, 526, etc. On the pipeline cycles when an instruction is not issued, an empty cycle results 525, 527, etc. This continues until the condition which caused the throttle to be applied is no longer met. After instruction 531, it is determined that the throttle need no longer be applied and instructions are issued every pipeline cycle 532, 533, etc.

Figure 5D:
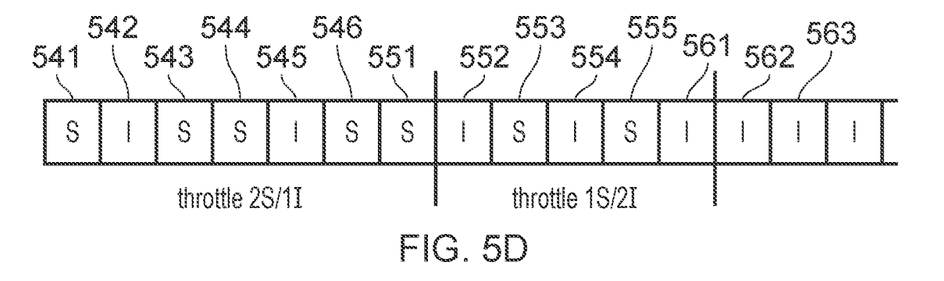

FIG. 5D illustrates the case in which a first throttle is applied due to a first condition being met and a second throttle applied due to a second condition being met. Initially, it is determined that a high level of throttling must be applied and instructions are issued every third pipeline cycle 542, 555 etc. On the pipeline cycles when an instruction is not issued, an empty cycle results 541, 543, 544, 546, etc. This continues until after step 551, when it is determined that the level of throttling can be eased back to issue one instruction every second pipeline cycle 552, 554, etc. On the pipeline cycles when an instruction is not issued, an empty cycle results 553, 555, etc. This continues until after step 561, where it is determined that there is no longer a need to throttle the rate at which instructions are issued and instructions are thereafter issued at a rate of one instruction per pipeline cycle 562, 563, etc.

Figure 6:
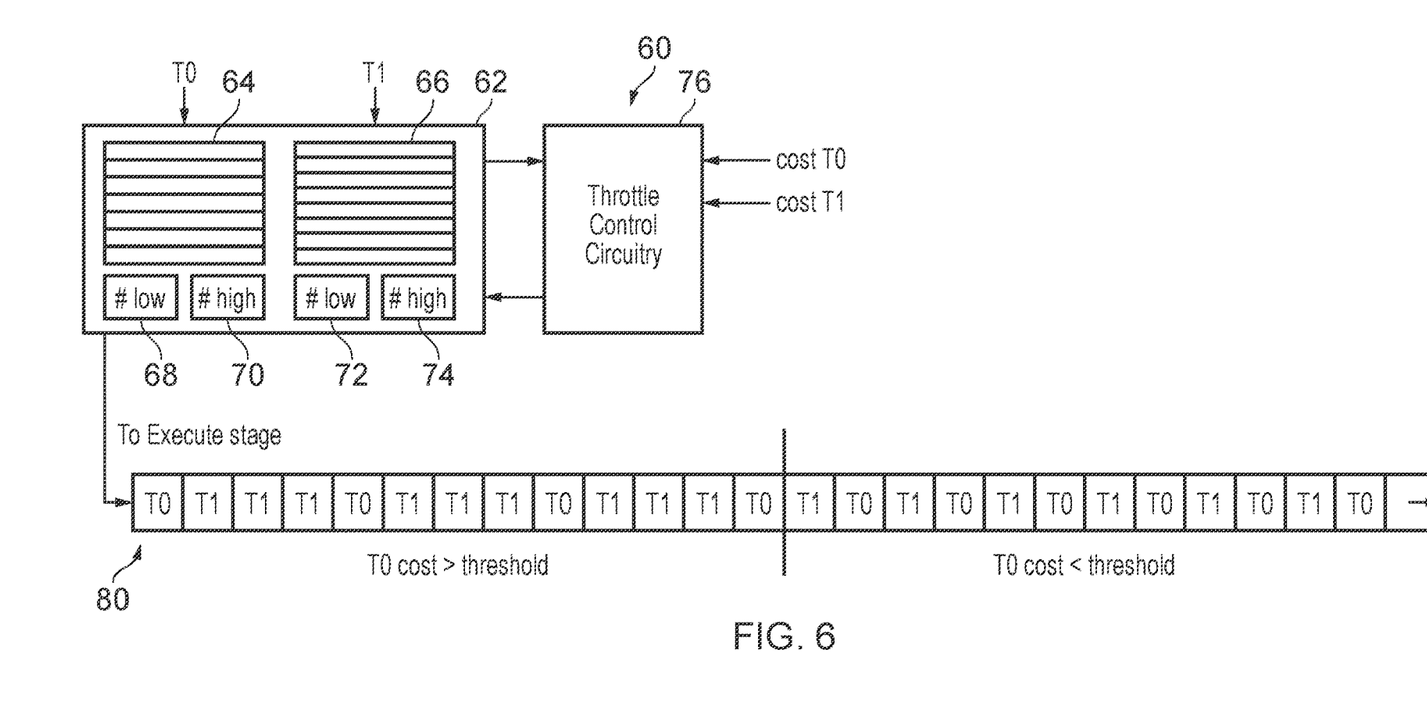
FIG. 6 schematically illustrates a sequence of instructions issued from a plurality of threads by the data processing apparatus in some embodiments.

FIG. 6 schematically illustrates a sequence of instructions issued from a plurality of threads by the data processing apparatus in some embodiments. In this embodiment, the data processing apparatus is a multithreaded data processing apparatus 60. The multithreaded data processing apparatus 60 comprises issue circuitry 62 configured to receive instructions from a first thread T0 in a first queue 64 and a second thread T1 in a second queue 66. Issue circuitry is equipped with multiple sets of counters including a first low confidence counter 68 to count the number of low confidence branches issued by the first thread, a first high confidence counter 70 to count the number of high confidence branches issued by the first thread, a second low confidence counter 72 to count the number of low confidence branches issued by the second thread, and a second high confidence counter 74 to count the number of high confidence branches issued by the second thread. The first and second high and low confidence counters 68, 70, 72, and 74 are coupled to the throttle control circuitry 76, which also takes as inputs a first speculation cost for the first thread and a second speculation cost for the second thread. The first and second speculation costs are calculated by the commit stage 28 (not shown in this figure). The throttle control circuitry determines the rate at which instructions from the first and second threads are passed to the execute stage 26 (not shown) in dependence on the first and second speculation costs and the first and second high and low confidence counters 68, 70, 72, and 74. When no throttle is applied, the issued instructions 80 comprise alternating instructions from the first and second thread. It should be appreciated by the person of ordinary skill that this pattern of issuing instructions is purely for illustrative purpose and any combination of issued instructions from the first and second threads could be envisaged dependent on one or more parameters of the instructions themselves or the execution circuitry and timing constraints put on the first and second threads. As an example we consider the case in which the first thread T0 is executing speculatively. When no threshold is applied the instructions from thread T0 alternate with the instructions from thread T1 as described above. However, when the speculation cost associated with T0 increases above a threshold, the throttle control circuitry reduces the rate at which instructions from the thread T0 are issued. As there are spare pipeline cycles, these can be allocated to the thread T1, thereby increasing its throughput. In the illustrated example in FIG. 6, when throttling is applied instructions from thread T0 are issued once every four pipeline cycles, whilst instructions from the thread T1 are issued three times every four instructions cycles. It should be readily apparent to one of ordinary in the art that the ratio of the number of pipeline cycles used for thread T0 to the number of pipeline cycles used for thread T1 can take any value and may depend on a range of factors other than the throttle control circuitry. In particular, it is possible, say, that timing constraints mean that even when throttled, instructions could be issued from thread T0 at a higher rate than the rate at which instructions are issued from the non-throttled thread T1.

In brief overall summary, apparatuses for data processing and methods of data processing are provided. A data processing apparatus performs data processing operations in response to a sequence of instructions including performing speculative execution of at least some of the sequence of instructions. In response to a branch instruction the data processing apparatus predicts whether or not the branch is taken or not taken further speculative instruction execution is based on that prediction. A path speculation cost is calculated in dependence on a number of recently flushed instructions and a rate at which speculatively executed instructions are issued may be modified based on the path speculation cost.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. A data processing apparatus comprising:
   data processing circuitry to perform data processing operations in response to a sequence of instructions, wherein the data processing circuitry is capable of performing speculative execution of at least some of the sequence of instructions; and
   branch prediction circuitry to generate a branch prediction of whether a branch instruction in the sequence of instructions will be taken or not taken,
   wherein the data processing circuitry is responsive to the branch prediction to perform speculative execution of instructions in dependence on the branch prediction,
   wherein the data processing circuitry is responsive to generation of the branch prediction by the branch prediction circuitry to calculate a path speculation cost in dependence on a ratio of a number of recently flushed instructions to a given number of instructions in a commit queue, and
   the data processing apparatus further comprises throttle control circuitry configured to control a rate at which instructions are passed to the data processing circuitry in dependence on the path speculation cost.

2. The data processing apparatus of claim 1, wherein the control by the throttle control circuitry is further dependent on a confidence level indicating how likely the branch prediction is to be incorrect.

3. The data processing apparatus of claim 2, wherein the confidence level is further dependent on a number of unresolved low confidence branches.

4. The data processing apparatus of claim 2, wherein the confidence level is further dependent on a number of unresolved low confidence branches and a number of unresolved high confidence branches.

5. The data processing apparatus of claim 4, wherein the confidence level is a linear function of the number of unresolved low confidence branches and the number of unresolved high confidence branches.

6. The data processing apparatus of claim 1, wherein the data processing circuitry is arranged to recalculate the path speculation cost after a second number of instructions have been added to the commit queue.

7. The data processing apparatus of claim 6, wherein the second number of instructions is greater than the given number of instructions, and the path speculation cost is recalculated in a final subset of the second number of instructions, wherein a number of instructions in the final subset of the second number of instructions is equal to the given number of instructions.

8. The data processing apparatus of claim 2, wherein the control by the throttle control circuitry of the rate at which instructions are passed to the data processing circuitry comprises stalling execution of instructions for a number of pipeline cycles.

9. The data processing apparatus of claim 8, wherein the number of pipeline cycles is one.

10. The data processing apparatus of claim 2, wherein the control by the throttle control circuitry of the rate at which instructions are passed to the data processing circuitry is dependent on a threshold condition being met and is maintained until the threshold condition is no longer met.

11. The data processing apparatus of claim 2, wherein the control by the throttle control circuitry of the rate at which instructions are passed to the data processing circuitry is dependent on a number of entries in a commit queue.

12. The data processing apparatus of claim 2, wherein the control by the throttle control circuitry of the rate at which instructions are passed to the data processing circuitry is dependent on the path speculation cost reaching a threshold path speculation cost and the confidence level reaching a threshold confidence level.

13. The data processing apparatus of claim 2, wherein the control by the throttle control circuitry of the rate at which instructions are passed to the data processing circuitry is dependent on a first condition and a second condition; wherein the first condition is met when the path speculation cost reaches a first threshold path speculation cost and the confidence level reaches a first threshold confidence level; and the second condition is met when the path speculation cost reaches a second threshold path speculation cost and the confidence level reaches a second threshold confidence level.

14. The data processing apparatus of claim 13, wherein the control by the throttle control circuitry of the rate at which instructions are passed to the data processing circuitry is further dependent on a third condition, the third condition is met when the confidence level reaches a third threshold confidence level.

15. The data processing apparatus of claim 2, wherein the data processing apparatus is configured to execute threads from a plurality of threads, each thread comprising a plurality of instructions, and the rate at which instructions are passed to the data processing circuitry comprises at least a first rate and a second rate, and the data processing apparatus is configured to:

issue instructions from a first thread from the plurality of threads at the first rate in dependence on a first path speculation cost calculated for the first thread; and issue instructions from a second thread from the plurality of threads at a second rate, wherein the second rate is modified in response to modifying the first rate.

16. The data processing apparatus of claim 15, wherein the second rate is increased in response to a decrease in the first rate.

17. A method of performing data processing comprising:

performing data processing operations by data processing circuitry in response to a sequence of instructions, wherein the data processing circuitry is capable of performing speculative execution of at least some of the sequence of instructions;

generating a branch prediction of whether a branch instruction in the sequence of instructions will be taken or not taken;

performing, in response to the branch prediction, speculative execution of instructions in dependence on the branch prediction;

calculating a path speculation cost in dependence on a ratio of a number of recently flushed instructions to a given number of instructions in a commit queue; and controlling a rate at which instructions are passed to the data processing circuitry in dependence on the path speculation cost.

18. A data processing apparatus comprising:

means for performing data processing operations in response to a sequence of instructions, wherein the means for performing data processing operations is capable of performing speculative execution of at least some of the sequence of instructions;

means for generating a branch prediction of whether a branch instruction in the sequence of instructions will be taken or not taken;

means for performing, in response to the branch prediction, speculative execution of instructions in dependence on the branch prediction;

means for calculating a path speculation cost in dependence on a ratio of a number of recently flushed instructions to a given number of instructions in a commit queue; and means for controlling a rate at which instructions are passed to means for performing data processing operations in dependence on the path speculation cost.

* * * * *